(12) United States Patent
Krammer

(10) Patent No.: US 10,316,875 B2
(45) Date of Patent: Jun. 11, 2019

(54) THEFT PROTECTION FOR THE PRIMARY COIL OF AN INDUCTIVE CHARGING STATION

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 481 days.

(21) Appl. No.: 15/136,124

(22) Filed: Apr. 22, 2016

(65) Prior Publication Data

US 2016/0236577 A1 Aug. 18, 2016

Related U.S. Application Data

(63) Continuation of application No. PCT/EP2014/072553, filed on Oct. 21, 2014.

(30) Foreign Application Priority Data

Oct. 24, 2013 (DE) .......................... 10 2013 221 648

(51) Int. Cl.
*F16B 5/12* (2006.01)
*H01F 27/02* (2006.01)
(Continued)

(52) U.S. Cl.
CPC ............ *F16B 5/126* (2013.01); *B60L 11/182* (2013.01); *H01F 27/02* (2013.01); *H01F 38/14* (2013.01);
(Continued)

(58) Field of Classification Search
CPC ............ A44B 18/0003; A44B 18/0069; A44B 18/0084; B60L 11/182; B60L 11/1824;
(Continued)

(56) References Cited

U.S. PATENT DOCUMENTS 4,879,854 A * 11/1989 Handler ................ E04B 2/7407
52/238.1
8,486,525 B2 * 7/2013 Segur ........................ F16L 5/02
428/343
(Continued)

FOREIGN PATENT DOCUMENTS

DE 10 2009 059 152 A1 6/2011
DE 10 2013 102 247 A1 9/2014
(Continued)

OTHER PUBLICATIONS

International Search Report (PCT/ISA/210) issued in PCT Application No. PCT/EP2014/072553 dated Mar. 26, 2015 with English translation (five pages).
(Continued)

*Primary Examiner* — Josh Skroupa
(74) *Attorney, Agent, or Firm* — Crowell & Moring LLP

(57) ABSTRACT

A device for securing a primary coil used for inductive charging fastens a rail to an underlying surface. The rail has a lower wall and at least one side wall. The device includes a connection strip, which has a longitudinal extent along the rail and which has an adequate width for covering the lower wall and at least partially the at least one side wall of the rail. The connection strip has an outer connection layer on an outer face, which outer connection layer is designed to produce adhesion between the connection strip and the surface along the lower wall of the rail. The connection strip has at least one inner connection layer on an inner face, which inner connection layer is designed to produce adhesion between the at least one side wall of the rail and the connection strip along the at least one side wall of the rail. The device also includes a housing, which can be connected to the rail and which blocks access to the rail when the housing is connected to the rail.

15 Claims, 3 Drawing Sheets

(51) Int. Cl.
*B60L 11/18* (2006.01)
*H01F 38/14* (2006.01)
*F16B 1/00* (2006.01)

(52) U.S. Cl.
CPC ... *B60L 2270/34* (2013.01); *F16B 2001/0028* (2013.01); *Y02T 10/7005* (2013.01); *Y02T 10/7072* (2013.01); *Y02T 90/122* (2013.01); *Y02T 90/14* (2013.01); *Y10T 403/47* (2015.01)

(58) Field of Classification Search
CPC .............. B60L 2230/10; B60L 2270/34; C09J 2203/30; C09J 2205/10; F16B 5/12; F16B 5/126; F16B 9/02; F16B 11/006; F16B 41/005; F16B 47/003; F16B 2001/0028; H01F 27/02; H01F 38/14; Y02T 10/7072; Y02T 10/7088; Y02T 90/122; Y02T 90/14; Y10T 403/39; Y10T 403/3906; Y10T 403/47; Y10T 403/471; Y10T 403/64; Y10T 403/7129
USPC ............... 403/187, 188, 265, 266, 335, 389; 428/343; 248/205.2, 205.3; 220/359.1, 220/359.2
See application file for complete search history.

(56) References Cited

U.S. PATENT DOCUMENTS 9,809,125 B2 * 11/2017 Kim .................... B60L 11/1824
2015/0061582 A1 3/2015 Tatsuta et al.

FOREIGN PATENT DOCUMENTS

EP 2 620 960 A1 7/2013
JP 2013-208054 A 10/2013

OTHER PUBLICATIONS

German-language Written Opinion (PCT/ISA/237) issued in PCT Application No. PCT/EP2014/072553 dated Mar. 26. 2015 (five pages).
German Search Report issued in counterpart German Application No. 10 2013 221 648.3 dated Sep. 25, 2014 with partial English translation (12 pages).

* cited by examiner

THEFT PROTECTION FOR THE PRIMARY COIL OF AN INDUCTIVE CHARGING STATION

CROSS REFERENCE TO RELATED APPLICATIONS

This application is a continuation of PCT International Application No. PCT/EP2014/072553, filed Oct. 21, 2014, which claims priority under 35 U.S.C. § 119 from German Patent Application No. 10 2013 221 648.3, filed Oct. 24, 2013, the entire disclosures of which are herein expressly incorporated by reference.

BACKGROUND AND SUMMARY OF THE INVENTION

The invention relates to the inductive charging of a rechargeable battery of a vehicle. In particular, the invention relates to a method and to a corresponding device for securing a primary coil used in the inductive charging.

Vehicles, in particular vehicles with an electric drive, include rechargeable batteries for storing electrical energy. The rechargeable battery of a vehicle can be recharged, for example, by connection to a power source external to the vehicle (for example by connection to a public electrical grid). One approach to the automatic, cableless, inductive charging of the battery of the vehicle consists in the electrical energy being transmitted to the battery from the floor to the underbody of the vehicle by magnetic induction via the underbody clearance. This is illustrated by way of example in FIG. 1. In particular, FIG. 1 shows a vehicle 100 with an accumulator 103 for electrical energy (for example with a rechargeable battery 103). The vehicle 100 includes a "secondary coil" 102 in the vehicle underbody, wherein the secondary coil 102 is connected to the accumulator 103 via impedance matching (not shown) and a rectifier 101.

The secondary coil 102 can be positioned over a primary coil 111, wherein the primary coil 111 is attached, for example, to the floor of a garage. The primary coil 111 is connected to a power supply 110. The power supply 110 may have a radio frequency generator which generates an alternating current (AC) in the primary coil 111, as a result of which a magnetic field is induced. In the event of sufficient magnetic coupling between primary coil 111 and secondary coil 102 via the underbody clearance 120, a corresponding voltage and, therefore, also a current is induced in the secondary coil 102 by the magnetic field. The current induced in the secondary coil 102 is rectified by the rectifier 101 and stored in the accumulator 103 (for example in the battery). Electrical energy can thus be transmitted in a cableless manner from the power supply 110 to the energy accumulator 103 of the vehicle 100.

In order to achieve sufficient magnetic coupling between primary coil 111 and secondary coil 102, the secondary coil 102 of the vehicle 100 should be positioned with a certain precision (typically ±10 cm) over the primary coil 111 (which is also referred to as a floor unit). In order to ensure precise positioning, the primary coil 111 should be secured fixedly on the floor in order to avoid slipping or movement of the primary coil 111. However, permanent securing, for example using a screw connection of the primary coil 111 to the floor, is frequently not possible here. For example, in an underground garage which is accessible to a large number of unknown individuals, it may not be permitted to carry out a fixed installation of the primary coil 111 in the floor (for example by means of screws). Furthermore, it may not be possible for any permanent holes for the screws of a primary coil 111 to be drilled on a parking space which is used only temporarily. In addition, it may not be possible for any holes to be drilled, for example, in a garage with a high-quality floor covering. Furthermore, it is conceivable that the primary coil 111 will have to be transferred in the foreseeable future to a different location, and therefore an installation of the primary coil 111 that can be removed without any problems or residue is desired.

In order to secure the primary coil 111, use could be made of a slip-proof mat. Such a slip-proof mat can be removed without a residue. However, a slip-proof mat does not provide adequate theft protection for the primary coil 111. A slip-proof mat therefore cannot be used in publicly accessible regions (such as, for example, in an underground garage).

The present document describes a method and a device which permit a primary coil 111 to be secured on a floor in a theft-proof manner and so as to be removable without a residue.

According to one aspect, a device is provided for securing a rail on an underlying surface (for example on the floor of a garage or a parking space). The device can be used in particular for placing a primary coil on the underlying surface. The rail can be a metal rail. The rail has a lower wall and at least one side wall. For example, the rail can have a rectangular cross section. Furthermore, the rail can have an elongated extent and can form a length-extended cuboid. The rail can form a frame by which a space for receiving the primary coil is formed. Alternatively, the rail can have a cavity, for example for receiving a cable.

The device has a connecting tape (for example an adhesive tape or a touch-and-close tape) which has a longitudinal extent along the rail. The connecting tape can in particular have a length which corresponds to the length of the rail. Furthermore, the connecting tape has a sufficient width in order to cover the lower wall and to at least partially (but optionally also completely) cover the at least one side wall of the rail. The rail typically comprises two side walls, and the connecting tape typically has a width in order to at least partially (but optionally also completely) cover the two side walls and the entire lower wall.

The connecting tape typically has a leaf-shaped configuration. Furthermore, the connecting tape typically has longitudinal sides along the longitudinal extent of the rail and ends along the cross section of the rail. Furthermore, the connecting tape has an outer side and an inner side. The inner side is designed here to enter laterally into connection with the rail, and the lower outer side is designed to enter into connection with the underlying surface.

The connecting tape has, on the outer side of the connecting tape, an external connecting layer which is designed to produce adhesion along the lower wall of the rail between the connecting tape and the underlying surface. The external connecting layer can be designed in particular to produce an adhesive connection and/or a touch-and-close connection. The adhesion between the connecting tape and the underlying surface can be designed in particular in such a manner that release of the rail in the transverse direction with respect to the underlying surface is prevented.

Furthermore, the connecting tape has, on the inner side, at least one internal connecting layer which is designed to produce adhesion along the at least one side wall of the rail between the at least one side wall of the rail and the connecting tape. The internal connecting layer can be designed in particular to produce an adhesive connection and/or a touch-and-close connection. The adhesion between the at least one side wall of the rail and the connecting tape can be designed in particular in such a manner that release of the rail in a direction perpendicular to the underlying surface is prevented.

The adhesions (or adhesive connections) are typically configured in such a manner that they can be removed without residue when required.

The device furthermore has a housing which is connectable to the rail and blocks access to the rail when the housing is connected to the rail. The housing can be designed to surround and/or to cover a primary coil for inductively charging a vehicle. Alternatively or additionally, the housing can be designed to enclose a cable for connecting the primary coil to a power supply. The housing therefore prevents unauthorized release of the adhesions and therefore a possible theft of a primary coil enclosed by the rail or a cable enclosed by the rail.

The rail and the housing can be connected to each other by a screw connection, for example. The housing can have a closeable covering by which access to the screw connection can be prevented in a closed state. By opening the cover, installation of the housing on the rail can be made possible. Furthermore, unauthorized removal of the housing can be prevented by a closed covering.

The connecting tape can have, on the inner side, an internal region for receiving the lower wall of the rail. The internal region typically lies opposite the external connecting layer. The internal region cannot have any adhesive connecting layer. This is advantageous with respect to removal of the rail. In a corresponding manner, the connecting tape can have, on the outer side, an external region which lies opposite the at least one internal connecting layer and which likewise does not have an adhesive connecting layer. This is advantageous for the handling of the connecting tape since a connecting layer in the external region would get in the way during the installation and removal of the rail.

The connecting tape can have a multiplicity of segments along the longitudinal extent. Internal connecting layers between two adjacent segments of the multiplicity of segments can be interrupted. In other words, the internal connecting layers and/or the connecting tape can be divided in the regions which are intended to cover the at least one side wall of the rail into separate segments. This has the advantage that the individual segments have a reduced adhesion force which can be overcome by a person in order to release an individual segment from the side wall of the rail. The connecting tape can therefore be released from the rail segment-by-segment. Furthermore, the multiplicity of segments together have a large adhesion force which prevents release of the rail. The division into segments also permits installation on underlying surfaces which are not entirely flat.

The connecting tape can have one or more tabs on a longitudinal side for detaching the adhesion between the at least one side wall of the rail and the connecting tape. In particular, each segment of the multiplicity of segments can have a tab. Alternatively or additionally, the connecting tape can have a tab at one end for detaching the adhesion between the connecting tape and the underlying surface. Pulling off the connecting tape can be facilitated by way of a tab.

Furthermore, the connecting tape can have transverse reinforcements in the region for receiving the lower wall of the rail in order to make it difficult to detach the adhesion between the connecting tape and the underlying surface by means of forces acting transversely on the rail.

Furthermore, a method for securing a rail on an underlying surface is described. The method includes features which correspond to the features of the device.

It should be noted that the methods, devices and systems described in this document can be used either on their own or in combination with other methods, devices and systems described in this document. Furthermore, any aspects of the methods, device and systems described in this document can be combined with one another in diverse ways. In particular, the features of the claims can be combined with one another in diverse ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
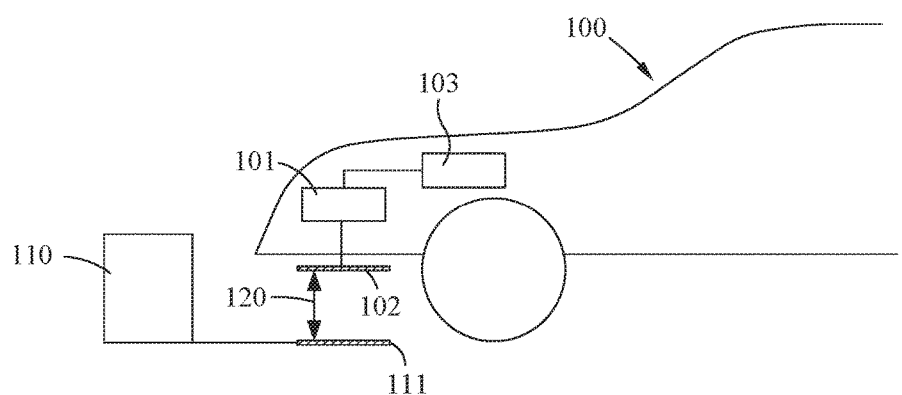
FIG. 1 is a schematic diagram of an exemplary device for inductively charging a vehicle.
Figure 2A:
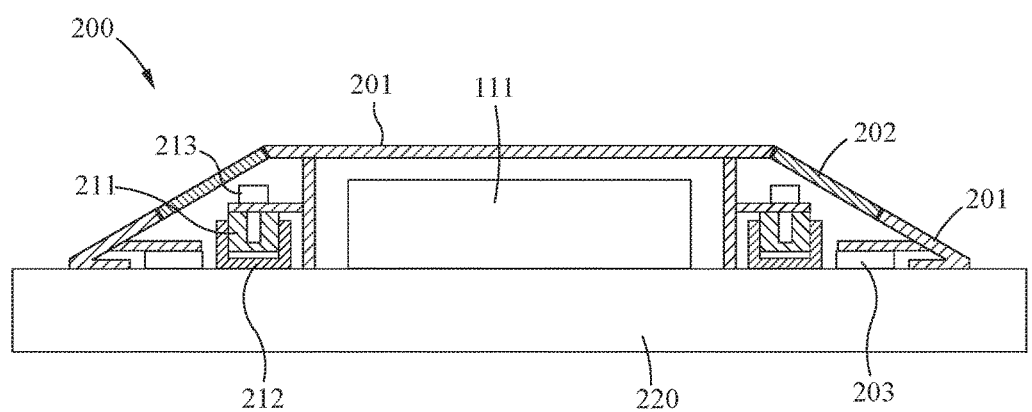
FIG. 2a is a side view of an exemplary device for securing a primary coil.

As explained at the beginning, the present document describes a device and a corresponding method for securing a primary coil 111 in a theft-proof manner and so as to be removable without residue. FIG. 2a shows the side view of an exemplary device 200. The device 200 includes a housing 201 which can be placed onto the floor 220 and thus covers the primary coil 111. The housing 201 can be the housing of the primary coil 111. The housing 201 has an upper wall and lateral walls by which the primary coil 111 is enclosed.

Furthermore, the device 200 includes a securing rail 211 (for example a metal rail). The securing rail 211 is fastened on the floor 220 (also called ground in this document) by use of an adhesive tape 212. The adhesive tape 212 surrounds the securing rail 211. In particular, the adhesive tape 212 has a lower surface with which the adhesive tape 212 is adhesively bonded onto the floor 220. Furthermore, the adhesive tape 212 has side surfaces with which the adhesive tape 212 is adhesively bonded to side walls of the securing rail 211. The housing 201 can then be fastened (for example by a screw connection illustrated in FIG. 2a by means of one or more screws 213) to the securing rail 211 which is fastened to the floor 220.

The device 200 illustrated in FIG. 2a has two securing rails 211 on a left and a right side of the housing 201. It is emphasized that a different number of securing rails 211 can be used. In particular, the housing 201 can be surrounded by securing rails 211 or by a securing frame 211 in order to fasten the housing to the floor 220 on all sides. It should furthermore be emphasized that, instead of an adhesive connection to the securing rail 211 and/or to the floor 220, the adhesive tape 212 can provide a touch-and-close connection.

By use of an adhesive/touch-and-close connection, the securing rail 211 and therefore also the housing 201 can be removed from the floor 220 without residue. At the same time, the adhesive/touch-and-close connection ensures that the primary coil 111 enclosed by the housing 201 cannot be stolen.

The device 200 can furthermore have a removable covering 202. The covering 202 can be fastened to the housing 201 by screws. The screws can have special screw head drives in order to prevent opening of the covering 202 using conventional screwdrivers. Alternatively or additionally, the covering 202 can be pushed laterally into the housing 201 and closed. By removing the covering 202, access to the one or more screws 213 can be made possible in order to fasten the housing 201 to the securing rail 211 or to remove the housing from the securing rail 211. Furthermore, the closed covering 202 prevents access to the one or more screws 213 and thereby prevents unauthorized removal of the housing 201 and of the primary coil 111.

The device 200 can furthermore have a reach-under protector 203. By means of the reach-under protector 203, a flat object (for example a knife) can be prevented from being moved laterally under the securing rail 211 in order to cut the adhesive tape 212 below the rail 211. The reach-under protector 203 can be fastened to the housing 201.

It is therefore proposed in this document to adhesively bond an adhesive strip 212 onto the floor 220. The adhesive strip 212 can be removed without residue when required. A rail 211 is adhesively bonded to the adhesive strip 212 or is fastened thereto by a touch-and-close lock. The second connection can likewise be released again. However, the rail 211 cannot be removed without the adhesive/touch-and-close strip 212 being previously pulled off since the entire connecting surface would have to be released at the same time. However, this requires high forces which cannot readily be applied by a potential thief.

The primary coil 111 or the housing 201 of the primary coil 111 can then be screwed onto the rail 211. The primary coil 111 (or the housing 201) is then no longer releasable since the entire adhesive/touch-and-close surface would have to be torn away simultaneously, which, as already mentioned, would require great forces. By means of a reach-under protector 203 and/or by means of a closeable covering 202, access by unauthorized persons to the fastening system 211, 212, 213 (i.e. to the adhesive strip 212, to the rail 211 and/or to the screws 213) can be prevented.

Figure 2B:
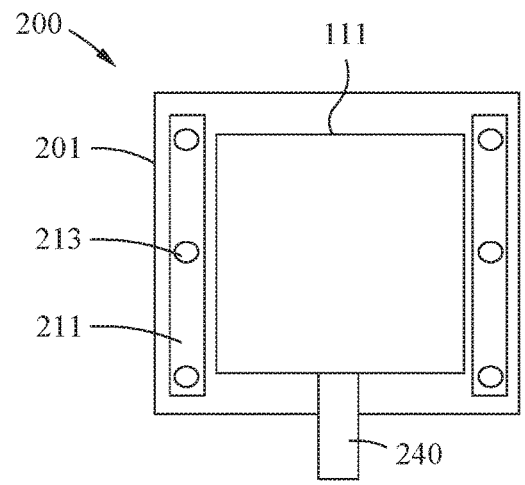
FIG. 2b is a top view of the exemplary device for securing a primary coil.

FIG. 2b shows a top view of the exemplary device 200. FIG. 2b shows in particular the primary coil 111 and the housing 201 of the primary coil 111. Furthermore, FIG. 2b shows two securing rails 211 to which the housing 201 is fastened by screws 213. In addition, FIG. 2b shows a cable duct 240 which is led out of the housing 201 and which can be used to guide cables for the energy supply of the primary coil 111 to the primary coil 111.

Figure 2C:
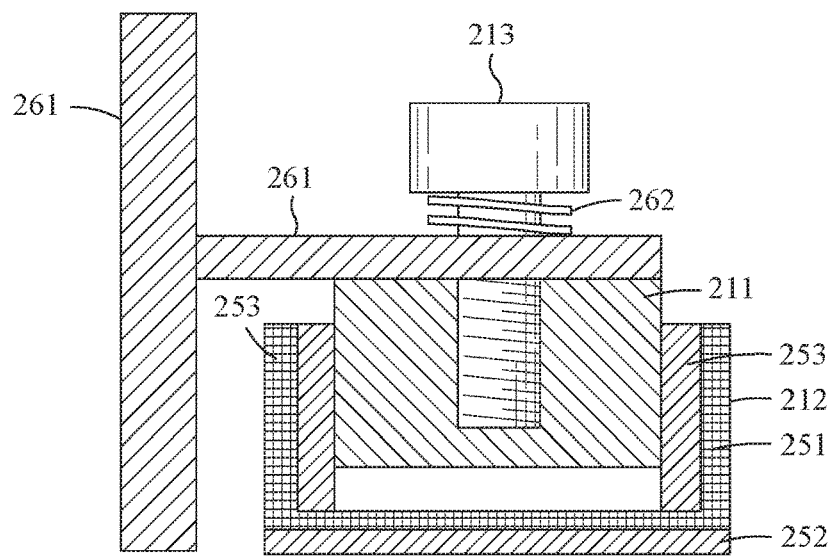
FIG. 2c is a view of an exemplary rail of the device for securing a primary coil.

FIG. 2c shows further details of the fastening system 211, 212, 213. In particular, FIG. 2c shows a side wall 261 of the housing 201. The side wall 261 is fastened to the rail 211 by the screw 213. The screw 213 can be fastened by a spring 262, wherein a defined pressing force of the housing 201 against the floor 220 can be set using the spring 262. The rail 211 has a bore and a thread for receiving the screw 213.

The rail 211 is fastened to the floor 220 using the adhesive tape 212. As illustrated in FIG. 2c, the adhesive tape 212 has a basic structure or a basic surface 251 on which adhesive layers 252, 253 are mounted. The adhesive tape 212 encloses the lower wall and the two side walls of the rail 211. On the upper side of the basic structure 251, the adhesive tape 212 has adhesive layers 253 which are designed for securing the side walls of the rail 211 with the adhesive tape 212. As a result, a fixed connection is achieved between rail 211 and adhesive tape 212. This connection in particular prevents the rail 211 from being able to be released from the adhesive tape 212 by pulling the rail away from the floor 220 since high lateral adhesive forces are in effect.

The adhesive tape 212 typically does not have any adhesive layer on the upper side of the basic structure 251, by which adhesive layer the lower wall of the rail 211 is secured with the adhesive tape 212. Owing to the high adhesive forces on the side walls of the rail 211, an additional adhesive connection on the base of the rail 211 is generally not required. In addition, by dispensing with an adhesive connection between lower wall of the rail 211 and adhesive tape 212, an (authorized) release of the connection between rail 211 and adhesive tape 212 is facilitated.

Furthermore, the adhesive tape 212 has an adhesive layer 252 on the lower side of the basic structure 251. The adhesive layer 252 is designed to provide an adhesive connection between adhesive tape 212 and floor 220. The adhesive layer 252 extends along the lower wall of the rail 211. However, the lower side of the basic structure 251 (i.e. the outer side of the adhesive tape 212) typically does not have an adhesive layer 252 on the side walls of the rail 211.

Figure 3A:
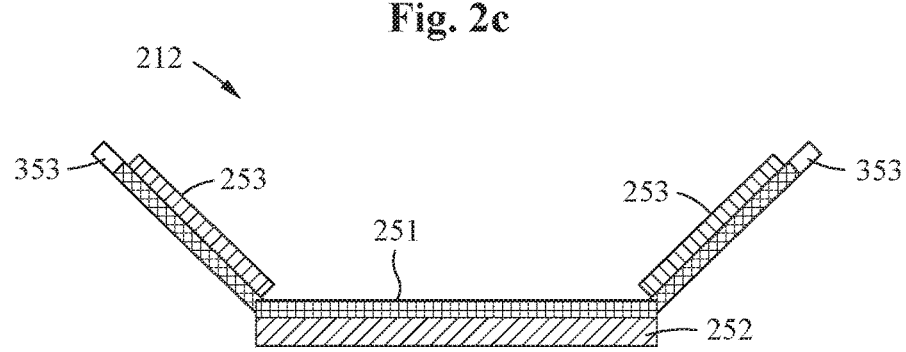
FIG. 3a is a side view of an exemplary adhesive tape.

FIG. 3a shows further details of the construction of the adhesive tape 212. In particular, FIG. 3a shows the adhesive tape 212 prior to the construction of a connection to the rail 211. FIG. 3a shows the basic structure 251 of the adhesive tape 212, and the adhesive layers 253 on the upper side of the basic structure 251, which adhesive layers can produce a connection between the side walls of the rail 211 and the adhesive tape 212. In addition, FIG. 3a shows the adhesive layer 252 on the lower side of the basic structure 251, by means of which adhesive layer a connection can be produced between the adhesive tape 252 and a floor 220 (for example a garage floor). As already explained above, pulling away of the housing 201 in a direction perpendicular to the floor 220 is prevented by the adhesive layers 253. Furthermore, slight flexibility in the transverse direction (i.e. parallel to the floor 220) is ensured by means of the adhesive layer 252. The combination of the adhesive layers 252, 253 therefore provides reliable protection against unauthorized removal of the primary coil 111.

Furthermore, FIG. 3a shows laterally attached tabs 353. The tabs 353 can be free of any adhesive layer. In particular, the tabs 353 can make it possible for the adhesive tape 212 to be pulled off the side walls of the rail 211. This is clarified in FIG. 3b. It is shown here that the adhesive tape 212 can be divided into segments 312. In particular, the (lateral) adhesive layers 253 can be divided into segments 312 in order to facilitate the detaching of the lateral adhesive layers 253. Each segment 312 can have a tab 353 with which the corresponding segment 312 can be released from the side wall of the rail 211. By means of the segmentation of the lateral adhesive layers 253, the detaching of the adhesive tape 212 from the side walls of the rail 211 is facilitated. Also, the securing of the rail 211 with respect to forces acting on the rail 211 from above is only imperceptibly reduced. Furthermore, the segmentation permits installation on an uneven underlying surface (as illustrated in FIG. 4).

Furthermore, the adhesive tape 212 can have a tab 354 at one or both ends of the adhesive tape 212. The tab 354 can be used to pull off the adhesive tape 212 from the floor 220 in the longitudinal direction.

The adhesive tape 212 can have transverse reinforcements 351 in the basic structure 251, said transverse reinforcements preventing, or at least making it difficult, to pull off the (lower) adhesive layer 252 transversely. The transverse reinforcements 351 are typically used in those regions of the basic structure 251 which are intended to be connected to the floor 220.

Figure 4:
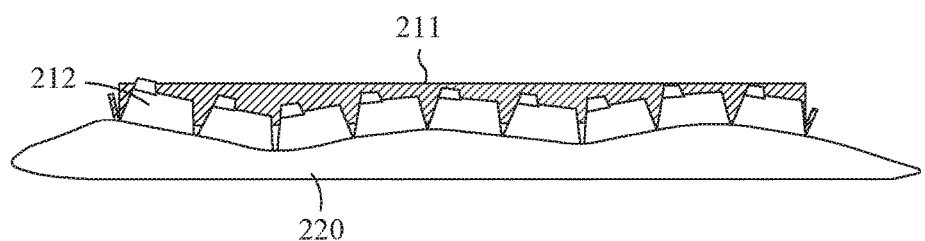
FIG. 4 is a side view of a primary coil secured on an uneven floor.

FIG. 4 shows the securing of a rail 211 by an adhesive tape 212 with segments 312 on an uneven floor 220. It is apparent that unevennesses can be absorbed by the adhesive tape 212 and the segmentation thereof. By securing the lower side of the adhesive tape 212 on the floor 220, release of the rail 211 in the transverse direction is prevented, and, by securing the adhesive tape 212 to the sides of the rail 211, release of the rail 211 perpendicular to the floor 220 is prevented. Furthermore, by securing the housing 201 on the rail 211 (as illustrated in FIG. 2a), access to the adhesive tape 212 is prevented, and therefore detaching of the adhesive tape 212 from the rail 211 is prevented.

Figure 3B:
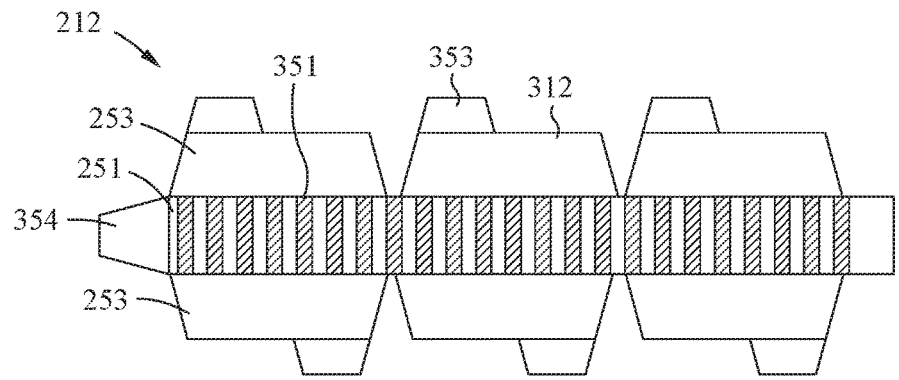
FIG. 3b is a top view of the exemplary adhesive tape.
Figure 5:
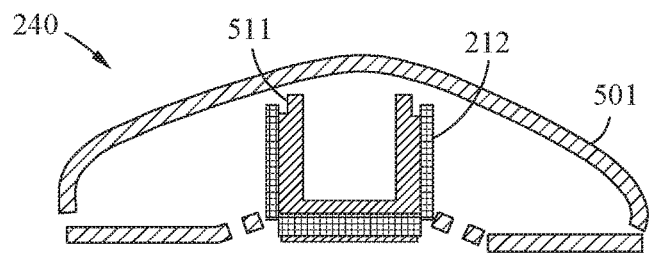
FIG. 5 is a view of an exemplary device for securing the cable duct of a primary coil.

The adhesive tape 212 described in FIGS. 3a and 3b can also be used for securing a cable duct 240 for the primary coil 111. This is illustrated in FIG. 5. FIG. 5 shows the cross section of an exemplary cable duct 240. The cable duct 240 has a cover 501 which encloses a rail 511. In the example illustrated in FIG. 5, the rail 511 and the cover 501 form a unit. The lower side of the unit has openings through which the segments 312 of the adhesive tape 212 can be guided in order to fasten the side walls of the rail 511. For this purpose, the segments 312 can be at a certain distance from one another in order to permit a periodic connection (at points between the segments 312) between cover 501 and rail 511. The rail 511 has a cavity in which the cables for the primary coil 111 can be guided.

A system 200 which permits installation of the primary coil 111 by use of adhesive strips 212 and/or touch-and-close locks is therefore described. The system 200 is designed in such a manner that the primary coil 111 can only be removed by an authorized person (who, for example, is in possession of a key for opening the covering 202). As a basic principle, use is made here of the principle of a touch-and-close lock 212 or of an adhesive strip 212. An extensive touch-and-close or adhesive connection is produced by the tape 212. The extensive connection cannot be released or displaced with the entire surface in one step. A separation is possible only by pulling off directly at the rail 211, 511. The division of the tape 212 into segments 312 permits the stepwise release of partial surfaces of the connection. A segment 312 is typically a relatively short migrating line along which the adhesive/touch-and-close strip 212 can be pulled off. By means of the at all times relatively small surface of a segment 312 which is to be released, the pulling-off forces are correspondingly small.

The sole part which typically has to be renewed after removal in order to install the primary coil 111 for the second time is the adhesive/touch-and-close tape. The other components of the device 200 are reusable.

The device 200 may include in particular: one or more intermediate carriers 211 (for example rails or frames) which are adhesively bonded onto the floor 220 using the adhesive tape 212. In a second step, the floor unit (i.e. the housing 201 and the primary coil 111) can then be mounted onto the intermediate carrier 211. However, the one or more intermediate carriers 211, 511 may be on part of the object to be fastened. In this case, the adhesive tape 212 can be adhesively bonded directly onto the floor unit to be installed. The fastening system 200 can be protected via a covering 202 against unauthorized access. The covering 202 may be, for example, a covering of the cable duct 240 or a covering part of the floor unit 201, 111. The coverings 202 can be protected by a corresponding screw connection or by a lock against unauthorized removal. A plurality of parts of a covering 202 can be designed (for example can be pushed over one another) in such a manner that only part of the covering 202 has to be "closed" (in particular the final part which is fitted or the first part which has to be removed).

As illustrated in FIG. 4, the system 220 can also be installed on an uneven underlying surface. In addition, the system can be supplemented with a theft protection warning which, for example when the connecting line between floor unit 201, 111 and electronics 110 is severed, an acoustic, optical and/or telecommunications warning message triggered.

With the device 200, a theft-proof installation of the primary coil 110 can be carried out without special knowledge. The primary coil 110 can be removed again at any time "without residue". Furthermore, a slip-proof installation on highly diverse floor conditions is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device comprising:
a rail having a lower wall and at least one side wall; and
a connecting tape wherein:
the connecting tape has a longitudinal extent along the rail,
the connecting tape has a sufficient width in order to cover the lower wall and at least partially to cover the at least one side wall of the rail,
the connecting tape has, on an outer side, an external connecting layer producing adhesion along the lower wall of the rail between the connecting tape and an underlying surface to which the rail is secured, and
the connecting tape has, on an inner side, at least one internal connecting layer which is designed to produce adhesion along the at least one side wall of the rail between the at least one side wall of the rail and the connecting tape, and
a housing which is connectable to the rail and blocks access to the rail when the housing is connected to the rail.

2. The device according to claim 1, further wherein:
the connecting tape has, on the inner side, an internal region for receiving the lower wall of the rail, which internal region does not have an adhesive connecting layer and lies opposite the external connecting layer, and/or
the connecting tape has, on the outer side, an external region which lies opposite the at least one internal connecting layer and which does not have an adhesive connecting layer.

3. The device according to claim 2, further wherein:
the connecting tape has a multiplicity of segments along the longitudinal extent, and
internal connecting layers between two adjacent segments of the multiplicity of segments are interrupted.

4. The device according to claim 3, further wherein:
the connecting tape has longitudinal sides along the longitudinal extent and ends, and
the connecting tape has, on a longitudinal side, one or more tabs for detaching the adhesion between the at least one side wall of the rail and the connecting tape, and/or
the connecting tape has a tab at one end for detaching the adhesion between the connecting tape and the underlying surface.

5. The device according to claim 4, further wherein the connecting tape has transverse reinforcements in a region for receiving the lower wall of the rail, whereby detachment of the adhesion between the connecting tape and the underlying surface by forces acting transversely on the rail is made difficult.

6. The device according to claim 1, further wherein:
the connecting tape has a multiplicity of segments along the longitudinal extent, and
internal connecting layers between two adjacent segments of the multiplicity of segments are interrupted.

7. The device according to claim 1, further wherein:
the connecting tape has longitudinal sides along the longitudinal extent and ends, and
the connecting tape has, on a longitudinal side, one or more tabs for detaching the adhesion between the at least one side wall of the rail and the connecting tape, and/or
the connecting tape has a tab at one end for detaching the adhesion between the connecting tape and the underlying surface.

8. The device according to claim 1, further wherein the connecting tape has transverse reinforcements in a region for receiving the lower wall of the rail, whereby detachment of the adhesion between the connecting tape and the underlying surface by forces acting transversely on the rail is made difficult.

9. The device according to claim 1, wherein the external and internal connecting layers are designed to produce an adhesive connection and/or a touch-and-close connection.

10. The device according to claim 1, wherein:
the rail and the housing are connectable to each other by a screw connection, and
the housing has a closeable covering by which access to the screw connection is preventable in a closed state.

11. The device according to claim 1, wherein:
the adhesion between the connecting tape and the underlying surface prevents release of the rail in the transverse direction with respect to the underlying surface, and
the adhesion between the at least one side wall of the rail and the connecting tape prevents release of the rail in a direction perpendicular to the underlying surface.

12. The device according to claim 1, wherein the housing is designed to enclose a primary coil for inductively charging a vehicle, and/or to enclose a cable for connecting the primary coil to a power supply.

13. The device according to claim 1, wherein the rail forms a frame by which a space for receiving a primary coil is formed.

14. The device according to claim 1, wherein the rail has a rectangular cross section.

15. The device according to claim 1, wherein the lower wall and the at least one side wall of the rail extent along an entire length of the rail, and wherein the longitudinal extent of the connecting tape spans along the length of the rail.

* * * * *